(12) United States Patent
Kaye et al.

(10) Patent No.: US 11,603,580 B2
(45) Date of Patent: Mar. 14, 2023

(54) METAL ALLOYS

(71) Applicants: New South Innovations Pty Limited, Sydney (AU); Lucia Kaye, Portland, OR (US); Shifrah Aron-Dine, Los Gatos, CA (US); Allison Lim, Golden, CO (US); Lori Bassman, Claremont, CA (US)

(72) Inventors: Lucia Kaye, Portland, OR (US); Shifrah Aron-Dine, Los Gatos, CA (US); Allison Lim, Golden, CO (US); Lori Bassman, Claremont, CA (US); Kevin Laws, Hobartville (AU); Warren McKenzie, Freshwater (AU); Caitlin Healy, Marouba (AU)

(73) Assignee: ADVANCED ALLOY HOLDINGS PTY LTD., Freshwater (AU)

( * ) Notice: Subject to any disclaimer, the term of this patent is extended or adjusted under 35 U.S.C. 154(b) by 1110 days.

(21) Appl. No.: 16/074,397

(22) PCT Filed: Jan. 31, 2017

(86) PCT No.: PCT/AU2017/050080
§ 371 (c)(1),
(2) Date: Jul. 31, 2018

(87) PCT Pub. No.: WO2017/132725
PCT Pub. Date: Aug. 10, 2017

(65) Prior Publication Data
US 2020/0131603 A1     Apr. 30, 2020

(30) Foreign Application Priority Data
Feb. 1, 2016   (AU) ............................. 2016900313

(51) Int. Cl.
C22C 5/04         (2006.01)
C22C 30/00        (2006.01)
(Continued)

(52) U.S. Cl.
CPC ............... *C22C 5/04* (2013.01); *C22C 30/00* (2013.01); *C22F 1/14* (2013.01); *A44C 27/003* (2013.01)

(58) Field of Classification Search
CPC ........................................................ C22C 5/04
See application file for complete search history.

(56) References Cited

U.S. PATENT DOCUMENTS 5,242,762 A * 9/1993 Kouchiyama .......... G11B 5/656
                                                              148/313
6,607,847 B2   8/2003 Zhao et al.
(Continued)

FOREIGN PATENT DOCUMENTS

EP     0234790 A1    9/1987
JP     H05-86456 A   4/1993
WO     2017/132725 A1  8/2017

OTHER PUBLICATIONS

International Search Report and Written Opinion dated Apr. 10, 2017, for International Application No. PCT/AU2017/050080, filed on Jan. 31, 2017.

(Continued)

*Primary Examiner* — Christopher S Kessler
(74) *Attorney, Agent, or Firm* — K&L Gates LLP; Louis C. Cullman; Benjamin D. Heuberger

(57) ABSTRACT

Metal alloys including platinum are disclosed. The alloys have a similar variety of applications to platinum-based alloys. The alloy with a solid solution matrix consisting of: Platinum (Pt) 20 to 70 at. %; Palladium (Pd)>0 to 70 at. %; Cobalt (Co)>0 to 50 at. % and at least one of: Nickel (Ni)

(Continued)

up to 50 at. %; Chromium (Cr) up to 50 at. % and Iron up to 50 at. %.

17 Claims, 1 Drawing Sheet

(51) Int. Cl.
  *C22F 1/14* (2006.01)
  *A44C 27/00* (2006.01)

(56) References Cited

U.S. PATENT DOCUMENTS

| | | |
|---|---|---|
| 2008/0298997 A1 | 12/2008 | Tews |
| 2012/0123525 A1* | 5/2012 | Kramer-Brown ..... A61L 31/022 623/1.34 |
| 2014/0021043 A1 | 1/2014 | Miyashita et al. |
| 2019/0161840 A1* | 5/2019 | Yao .......................... C22F 1/10 |

OTHER PUBLICATIONS

Extended European Search Report dated Jun. 24, 2019, for European Patent Application No. 17746639.8.

\* cited by examiner

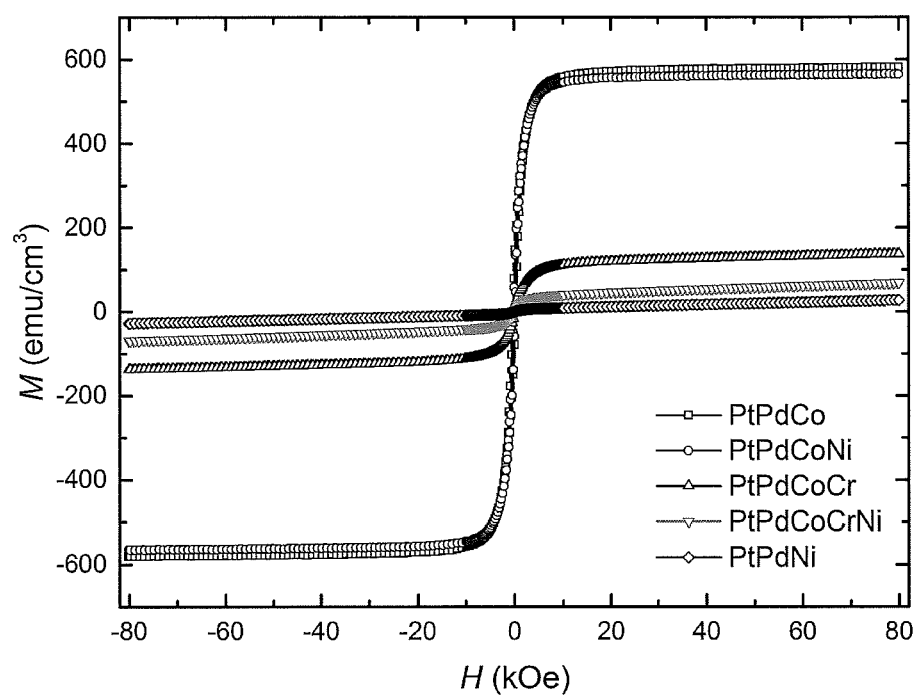

METAL ALLOYS

CROSS-REFERENCE TO RELATED CASES

This application is the U.S. national phase of International Patent Application No. PCT/AU2017/050080, filed Jan. 31, 2017, which claims priority to Australian Patent Application No. 2016900313, filed Feb. 1, 2016. The entire contents of each of these applications are incorporated herein by reference.

TECHNICAL FIELD

Metal alloys including platinum are disclosed. The alloys have a similar variety of applications to platinum-based alloys.

BACKGROUND

Current platinum-based alloys are often used in jewellery because of their high lustre and non-tarnishing characteristics. However, platinum is costly and its high atomic weight means that its alloys are relatively heavy. Furthermore, such alloys become brittle when worked meaning that the alloys need to be cast in near net shape to avoid cracking when working. This is particularly important for repairing or re-sizing jewellery made of platinum-based alloys because cracks present in jewellery are undesirable, at least, from the view point of aesthetics.

Typical platinum-based alloys used in jewellery include 85 to 100 wt. % platinum in combination with one of the following alloying elements: copper, cobalt, iridium, palladium or ruthenium. While the alloying additions impact upon the properties of the alloy, the alloying additions are relatively small so that the properties are adjusted enough to facilitate working of the alloys to form jewellery, but the overall properties remain closely aligned to the properties of platinum. Generally speaking, the hardness of the platinum-based alloys used in jewellery is less than 160 Hv and is more typically less than 130 Hv.

Another dominant use for platinum-based alloys is as a catalyst for chemical reactions. One common application in this respect is in catalytic converters for vehicles. The converter operates to fully combust hydrocarbons in exhaust gas from a vehicle engine. The combustion products are carbon dioxide and water vapour. However, the use of platinum in catalytic converters is limited by its cost.

It would be advantageous to produce a range of alloys that take advantage of the properties of platinum, but are less costly to produce and have a wider range of applications.

SUMMARY OF THE DISCLOSURE

The applicants have found that alloying platinum with large amounts of palladium and with significant amounts of one or more of cobalt, nickel, iron and chromium, the resultant alloys can be engineered to be significantly harder, stronger and may also exhibit magnetic properties. Additionally, the amounts of palladium, cobalt, nickel and chromium can be adjusted such that the properties of the alloy can be tailored to specific applications.

Furthermore, the replacement of a significant amount of platinum with lower cost alloying elements results in alloys that are significantly less expensive than typical platinum-based alloys, for example, for jewellery.

More specifically, there is provided in a first aspect an alloy with a solid solution matrix comprising, consisting essentially of or consisting of:

| | |
|---|---|
| Platinum | 20 to 70 at. % |
| Palladium | >0 to 70 at. % |
| Cobalt | >0 to 50 at. % | and at least one of:

| | |
|---|---|
| Nickel | up to 50 at. % |
| Chromium | up to 50 at. % and |
| Iron | up to 50 at. % |

Collectively, the platinum-based alloys in accordance with the first aspect are termed 'high entropy platinum alloys' (HEPAs) on account of the lower amount of platinum and higher amounts of palladium and cobalt, and optionally nickel, chromium and/or iron.

Alloying platinum with palladium and cobalt and at least one of nickel, chromium and iron provides properties that are not available in current platinum-based alloys. Typically these new alloys have one or more of the following advantages over typical platinum-based alloys:
  superior hardness;
  improved workability;
  lower material cost;
  lower density; and
  processing at lower temperatures.

The applicants have also found that cobalt and chromium (separately and together) contribute to forming hard oxide thin films on the surface of the platinum alloys according to the first aspect. These films are similar to the oxide films that form on the surface of steel and which reduce the incidence of scratching. This property is particularly advantageous for jewellery. Furthermore, the HEPAs according to the first aspect which are engineered for jewellery making have a grey-silver appearance that is very similar to the appearance of existing platinum-based alloys used in jewellery making. Accordingly, it is anticipated that HEPAs can be substituted for the typical jewellery making platinum-based alloys with only a minor, and perhaps imperceptible, change of appearance.

The applicants anticipate that HEPAs that may include cobalt, nickel and chromium are biocompatible because they also have the hard oxide thin films which form due to the presence of cobalt and/or chromium. Specifically, it is thought that the hard oxide thin films are unreactive with the body chemistry, creating an impervious layer and, therefore, are unlikely to degrade. Pt and Pd are considered bio-inert. The chemistry of the HEPAs and the hard oxide films are also considered to be compatible with the immune system so that it is unlikely that an implant formed of HEPA will be rejected by the body or be toxic in any way.

It is further anticipated that HEPAs can provide lower-cost replacements for existing alloys used in catalytic converters. HEPAs may also be engineered to produce lower-cost replacements for other catalysis applications, such as in fuel cells, electrochemical batteries and photocatalysis of water. Specifically, the increased disorder and presence of multiple atomic species in high entropy alloys imparts local fluctuations in crystal lattice strain and local electron-bond structure which results in them having a high density of crystallographic and surface defects or variations that can act as preferred sites for a catalysed chemical reaction.

The applicants have also found that selectively alloyed HEPAs have magnetic properties that make them suitable for magneto-optical devices (e.g. re-writable DVDs) and magnetic storage devices (e.g. hard drives) for long-term data storage.

In one embodiment the alloy (or the solid solution matrix) of the first aspect may comprise, consist or consist essentially of:

| | |
|---|---|
| Platinum (Pt) | 20 to 60 at. % |
| Palladium (Pd) | 10 to 70 at. % |
| Cobalt (Co) | 10 to 50 at. % | and at least one of:

| | |
|---|---|
| Nickel (Ni) | up to 40 at. % |
| Chromium (Cr) | up to 40 at. % and |
| Iron (Fe) | up to 40 at. % |

In another embodiment the alloy (or the solid solution matrix) of the first aspect may comprise, consist or consist essentially of:

| | |
|---|---|
| Platinum (Pt) | 20 to 50 at. % |
| Palladium (Pd) | 10 to 40 at. % |
| Cobalt (Co) | 10 to 40 at. % | and at least one of:

| | |
|---|---|
| Nickel (Ni) | 10 to 40 at. % |
| Chromium (Cr) | 10 to 40 at. % and |
| Iron (Fe) | 10 to 40 at. % |

In a further embodiment the alloy (or the solid solution matrix) of the first aspect may comprise, consist or consist essentially of:

| | |
|---|---|
| Platinum (Pt) | 20 to 50 at. % |
| Palladium (Pd) | 10 to 25 at. % |
| Cobalt (Co) | 20 to 40 at. % | and at least one of:

| | |
|---|---|
| Nickel (Ni) | 20 to 25 at. % |
| Chromium (Cr) | 10 to 25 at. % and |
| Iron (Fe) | 10 to 25 at. % |

The alloy (or the solid solution matrix) of the first aspect may comprise, consist or consist essentially of:

| | |
|---|---|
| Platinum (Pt) | 20 to 70 at. % |
| Palladium (Pd) | >0 to 70 at. % |
| Cobalt (Co) | >0 to 50 at. % | and at least one of:

| | |
|---|---|
| Nickel (Ni) | up to 50 at. % and |
| Chromium (Cr) | up to 50 at. % |

In one embodiment the alloy (or the solid solution matrix) of the first aspect may comprise, consist or consist essentially of:

| | |
|---|---|
| Platinum (Pt) | 20 to 60 at. % |
| Palladium (Pd) | 10 to 70 at. % |
| Cobalt (Co) | 10 to 50 at. % | and at least one of:

| | |
|---|---|
| Nickel (Ni) | up to 40 at. % and |
| Chromium (Cr) | up to 40 at. % |

In another embodiment the alloy (or the solid solution matrix) of the first aspect may comprise, consist or consist essentially of:

| | |
|---|---|
| Platinum (Pt) | 20 to 50 at. % |
| Palladium (Pd) | 10 to 40 at. % |
| Cobalt (Co) | 10 to 40 at. % | and at least one of:

| | |
|---|---|
| Nickel (Ni) | 10 to 40 at. % and |
| Chromium (Cr) | 10 to 40 at. % |

In a further embodiment the alloy (or the solid solution matrix) of the first aspect may comprise, consist or consist essentially of:

| | |
|---|---|
| Platinum (Pt) | 20 to 50 at. % |
| Palladium (Pd) | 10 to 25 at. % |
| Cobalt (Co) | 20 to 40 at. % | and at least one of:

| | |
|---|---|
| Nickel (Ni) | 20 to 25 at. % and |
| Chromium (Cr) | 10 to 25 at. % |

The alloy according to the first aspect may include, comprise or consist of equi-atomic additions of Pt, Pd, Co and Ni and/or Cr.

The alloy according to the first aspect may include, comprise or consist of Pt 35 to 55 at. %, Pd 5 to 25 at. % and Co 35 to 45 at. %.

In the alloy of the first aspect Pt may be present in an amount between 35 and 55 at. %, palladium may be present in an amount between 5 and 25 at. % and cobalt may be present in an amount between 35 and 45 at. %.

The alloy according to the first aspect may comprise, consist or consist essentially of Pt 35 to 45 at %, Pd 15 to 25 at. %, Co 15 to 35 at. % and Cr 5 to 25 at. %.

In the alloy of the first aspect Pt may be present in an amount between 35 and 45 at. %, palladium may be present in an amount between 15 and 25 at. %, cobalt may be present in an amount between 15 and 35 at. %, and chromium may be present in an amount between 5 and 25 at. %.

The alloy according to the first aspect may comprise, consist or consist essentially of Pt 25 to <35 at. %, Pd 15 to 25 at. %, Co 35 to 45 at. % and Cr 15 to 25 at. %.

In the alloy of the first aspect Pt may be present in an amount between 25 and <35 at. %, palladium may be present in an amount between 15 and 25 at %, cobalt may be present in an amount between 35 and 45 at. %, and chromium may be present in an amount between 15 and 25 at. %.

The matrix of the alloy according to the first aspect may have an as-cast hardness ($H_V$) in the range of 165 to 258.

The matrix of the alloy according to the first aspect may include Cr and have an as-cast hardness ($H_V$) in the range of 195 to 258.

The matrix of the alloy according to the first aspect may include Ni and have an as-cast hardness ($H_V$) in the range of 177 to 204.

The matrix of the alloy according to the first aspect may have a heat-treated hardness ($H_V$) in the range of 163 to 243.

The alloy may be heat-treated.

The alloy may be heat-treated under conditions selected to cause substantial homogenisation of the matrix. In this context, the term "substantial" is taken to mean that microsegregation is less than 3% in the heat-treated alloy.

The heat-treatment may comprise heating the alloy to an elevated temperature above 900° C. in an inert atmosphere.

The inert atmosphere may comprise argon.

The heat-treatment may comprise heating the alloy to an elevated temperature for a time in the range of >0 to 24 hours. Optionally, the time is in the range of >24 to 100 hours. Optionally, the time is in the range of >100 to 140 hours.

The term "alloy" as used throughout this specification includes a reference to castings. The term also includes within its scope other metal products, such as thin films for example, produced by deposition, growing, and plating, having a composition defined according to either of the first aspect or the second aspect defined herein.

An alloy according to a second aspect of the invention consists of, consists essentially of or comprises platinum, palladium and cobalt and one or more alloying elements selected from nickel, chromium and iron and wherein the alloy has entropy of mixing ($\Delta S_{mix}$) of at least 1.1R when calculated according to:

$$\Delta S_{mix} = -R \sum_{i=1}^{n} (c_i \ln c_i)$$ (Equation 1)

where c is the molar fraction of the ith component and R is the gas constant.

The alloy of the second aspect may comprise, consist or consist essentially of platinum, palladium and cobalt, and one or more alloying elements selected from nickel and chromium.

In one embodiment the alloy of the second aspect may comprise, consist or consist essentially of:

| | |
|---|---|
| Platinum (Pt) | 20 to 60 at. % |
| Palladium (Pd) | 10 to 70 at. % |
| Cobalt (Co) | 10 to 50 at. % | and at least one of:

| | |
|---|---|
| Nickel (Ni) | up to 40 at. % |
| Chromium (Cr) | up to 40 at. % and |
| Iron (Fe) | up to 40 at. % |

In another embodiment the alloy of the second aspect may comprise, consist or consist essentially of:

| | |
|---|---|
| Platinum (Pt) | 20 to 50 at. % |
| Palladium (Pd) | 10 to 40 at. % |
| Cobalt (Co) | 10 to 40 at. % | and at least one of:

| | |
|---|---|
| Nickel (Ni) | 10 to 40 at. % |
| Chromium (Cr) | 10 to 40 at. % and |
| Iron (Fe) | 10 to 40 at. % |

In a further embodiment the alloy of the second aspect may comprise, consist or consist essentially of:

| | |
|---|---|
| Platinum (Pt) | 20 to 50 at. % |
| Palladium (Pd) | 10 to 25 at. % |
| Cobalt (Co) | 20 to 40 at. % | and at least one of:

| | |
|---|---|
| Nickel (Ni) | 20 to 25 at. % |
| Chromium (Cr) | 10 to 25 at. % and |
| Iron (Fe) | 10 to 25 at. % |

The alloy of the second aspect may comprise, consist or consist essentially of:

| | |
|---|---|
| Platinum (Pt) | 20 to 70 at. % |
| Palladium (Pd) | >0 to 70 at. % |
| Cobalt (Co) | >0 to 50 at. % | and at least one of:

| | |
|---|---|
| Nickel (Ni) | up to 50 at. % and |
| Chromium (Cr) | up to 50 at. % |

In one embodiment the alloy of the second aspect may comprise, consist or consist essentially of:

| | |
|---|---|
| Platinum (Pt) | 20 to 60 at. % |
| Palladium (Pd) | 10 to 70 at. % |
| Cobalt (Co) | 10 to 50 at. % | and at least one of:

| | |
|---|---|
| Nickel (Ni) | up to 40 at. % and |
| Chromium (Cr) | up to 40 at. % |

In an alternative embodiment the alloy of the second aspect may comprise, consist or consist essentially of:

| | |
|---|---|
| Platinum (Pt) | 20 to 50 at. % |
| Palladium (Pd) | 10 to 40 at. % |
| Cobalt (Co) | 10 to 40 at. % | and at least one of:

| Nickel (Ni) | 10 to 40 at. % and |
|---|---|
| Chromium (Cr) | 10 to 40 at. % |

In another embodiment the alloy of the second aspect may comprise, consist or consist essentially of:

| Platinum (Pt) | 20 to 50 at. % |
|---|---|
| Palladium (Pd) | 10 to 25 at. % |
| Cobalt (Co) | 20 to 40 at. % | and at least one of:

| Nickel (Ni) | 20 to 25 at. % and |
|---|---|
| Chromium (Cr) | 10 to 25 at. % |

The alloy of the second aspect may comprise equi-atomic additions of Pt, Pd, Co and Ni and/or Cr.

The alloy of the second aspect may have an as-cast hardness ($H_V$) in the range of 165 to 258.

The alloy of the second aspect may include Cr and may have an as-cast hardness ($H_V$) in the range of 195 to 258.

The alloy of the second aspect may include Ni and may have an as-cast hardness ($H_V$) in the range of 177 to 204.

The alloy of the second aspect may have a heat-treated hardness ($H_V$) in the range of 163 to 243.

The alloy of the first or the second aspect may have entropy in the range of 1.1R to 2.0R.

BRIEF DESCRIPTION OF THE FIGURES

FIG. 1 depicts volume magnetization as a function of external magnetic field for selected alloys.

DESCRIPTION OF EMBODIMENTS

Test work carried out by the applicants has identified HEPAs as having desirable properties in comparison to the properties of typical platinum-based alloys. In particular, the HEPAs are based on the realisation by the applicants that the desirable properties are obtained by replacing a significant portion of platinum in typical platinum-based alloys with palladium and cobalt and with at least one of nickel, iron and chromium to produce alloys with considerably higher entropy of mixing compared with the entropy of mixing for typical platinum-based alloys.

Examples of alloys identified by the applicant were prepared and tested to determine their properties. The examples are outlined below in Table 1. All examples were prepared by the following method.

Pure elements Pt, Pd, Co, Cr, Ni were alloyed using a Buhler MAM1 mini arc melter in a Ti-gettered argon atmosphere to produce the nominal alloy compositions shown in Table 1. During the arc melting process, the samples were flipped and melted eight times to ensure homogeneity. Samples were heat treated in an elevator furnace at 1100° C. for 48 h and slowly cooled in a circulating argon atmosphere, with the exception of $Pt_{30}Pd_{20}Co_{30}Cr_{20}$ which was heat treated at 1100° C. for 96 h.

TABLE 1

Selected alloy compositions

| | Alloy | | | | | Hardness ($HV_{1kg}$) | |
|---|---|---|---|---|---|---|---|
| No. | Composition | E (GPa) | $\sigma_{y0.2\%}$ (MPa) | UTS (MPa) | $\varepsilon_f$ | As-Cast | Annealed |
| 1 | $Pt_{25}Pd_{25}Co_{25}Cr_{25}$ | 64.407 | 392 | 514 | 0.039 | 216 ± 15 | 200 ± 5 |
| 2 | $Pt_{25}Pd_{25}Co_{25}Ni_{25}$ | 40.241 | 284 | 668 | 0.404 | 196 ± 19 | 181 ± 7 |
| 3 | $Pt_{20}Pd_{20}Co_{20}Cr_{20}Ni_{20}$ | 55.819 | 354 | 734 | 0.435 | 200 ± 4 | 191 ± 6 |
| 4 | $Pt_{40}Pd_{20}Co_{40}$ | | | | | 173 ± 5 | 171 ± 8 |
| 5 | $Pt_{50}Pd_{10}Co_{40}$ | | | | | 185 ± 8 | 183 ± 8 |
| 6 | $Pt_{40}Pd_{20}Co_{20}Cr_{20}$ | | | | | 246 ± 12 | 236 ± 7 |
| 7 | $Pt_{40}Pd_{20}Co_{30}Cr_{10}$ | | | | | 204 ± 9 | 200 ± 6 |
| 8 | $Pt_{30}Pd_{20}Co_{30}Cr_{20}$ | | | | | 220 ± 9 | 210 ± 11 |

Compositional characterization of the samples/phases was performed via scanning electron microscopy using a Hitachi S3400 with backscatter detection and energy dispersive X-ray spectroscopy (EDS). The compositions of as-cast alloys were analyzed over large areas and found to be within ±2.2% of nominal compositions. The overall compositions of the alloys were determined via line scans and point sampling.

Powder X-ray diffraction (XRD) was used to characterise the crystal structure, [degree of ordering, and specific lattice parameters] of the equiatomic alloys (alloys using a PanAnalytical Xpert Multipurpose X-ray Diffraction System and a Cu $K_\alpha$ radiation source. The samples were powdered with a carbon steel file to avoid intensity bias in diffraction peaks due to texture.

Tensile testing was conducting on samples using an Instron 5982 screw mechanical testing unit with a 10 kN load cell. The samples were strained at 0.5 mm/min=8.33*10-3 mm/s until failure. The elongation and force were recorded by the Instron and converted to engineering stress and strain. The nominal sample geometry was; gauge length of 10 mm, gauge width of 3 mm, gauge thickness of 1 mm, overall length of 25 mm.

Vickers microhardness measurements were conducted on the samples using a Struers Duramin-A300 with a 1 kg load held for 10 seconds. Samples were polished to a 0.1 micron finish before testing and 10 measurements were made on each sample. The loadings were spaced at least five indent widths away from one another.

A common 1.1 T Fe—Nd—B permanent magnet was used to test whether magnetic attraction was present in the as-cast and heat treated samples and whether any observed magnetic behaviour was permanent/residual (hard magnetic materials) or non-permanent (soft magnetic).

The magnetic properties of representative alloys were tested. The samples were ground to powder and aligned magnetically to obtain the majority easy axis of the grains. The magnetic moment was measured as a function of external field at room temperature in a field range of −80 kOe<H<80 kOe (see Table 2). FIG. 1 shows the magnetic moment of the representative alloys as a function of external magnetic field. PtPdCoNi exhibits a high saturation magnetic moment of 565 emu/cm$^3$ (corresponding to a magnetization of 0.73 T).

TABLE 2

Volume magnetic moment and average magnetic moment per atom at H = 80 kOe and T = 300 K.

| Sample | $M_{vol}$ at 80 kOe (emu/cm$^3$) |
|---|---|
| PtPdCo | 580 |
| PtPdCoNi | 565 |
| PtPdCoCr | 137 |
| PtPdCoCrNi | 69 |
| PtPdNi | 27 |

All 8 of the as-cast alloys exhibited dendritic structure and microsegregation. The microsegregation was due to the difference in melting points of Pt (1769° C.) and Pd (1555° C.). Upon heat treatment, the alloys became predominantly single phase, with less than 4 at % variation between the microsegregated regions. The microstructure of the as-cast equiatomic Pt—Pd—Co—Cr can be observed by the light and dark regions in FIG. 1.

In the process of preparing the alloy no. 8, it was removed from Bakelite mounting in a vice and subject to an unquantified compression. This resulted in twinning behaviour.

There was little variation in the hardness of the as-cast and heat treated samples, as observed in Table 1. The hardness of the heat treated samples were slightly lower than the as-cast samples, likely due to structural homogenisation and removal residual stresses as a result of casting.

By way of summary, the test work revealed the following properties.
Mechanical Properties: The HEPAs are harder and stronger than pure platinum and typical platinum-based alloys and the HEPAs maintain high ductility/formability.
Production & Casting: The HEPAs may be prepared in a similar manner to typical platinum-based alloys, they maintain high castability/fluidity and have lower melting points than typical platinum-based alloys.
Oxidation/Tarnishing: Although platinum and palladium are essentially noble and do not corrode/oxidise, the other constituents of the HEPAs (cobalt, chromium and nickel) do. However, these oxides are very stable and are essentially self-healing and incredibly thin (not observable to the human eye); similar to that found with pure chrome or stainless steels. In other words, the HEPAs form a hard and passive oxide film which significantly reduces tarnishing and scratching.
Biocompatibility: Platinum and to an extent palladium are considered as bio-inert metals and do not interact with bodily function. Currently, Co—Ni—Cr alloys are used as acceptable orthopaedic implant materials due to the highly passive/inert oxide layer developed by such materials. However, Ni is now being critically analysed as it alone can be an irritant and toxic to cells. It is anticipated that a similar passive effect will exist with the HEPAs.

Alloy Variants by Application

The HEPA examples in Table 1 are a subset of the full range of potential HEPAs that can be usefully applied by adjusting the alloy composition to produce desired properties. Examples of the potential applications for HEPAs are set out below.

Pt-based Jewellery: Despite having large concentrations of other elements such as palladium, cobalt and chromium, in terms of their weight percentage, these alloys are predominantly platinum and would attract hallmark grades between Pt500 and Pt850 (Pt850 is quite popular in the current jewellery market). There is also room for commemorative or specialised currency/coinage applications.

Magnetic Pt-based Jewellery: Given the unique composition ranges and constituents of the HEPAs, some exhibit strong permanent magnetic properties. This fact gives rise to a range of unique and diverse potential applications in jewellery including; rings/components that attract one another magnetically, levitating jewellery, rotating/spinning jewellery components (like an electric motor).

Bio-alloys and components: The HEPAs are presumed to be bio-compatible and bio-inert. Similar to current Co—Ni—Cr bio-alloys, these alloys form a completely safe and passive Co—Cr oxide layer compatible with the human body, suitable for permanent orthopaedic or dental implants. These alloys however are much more malleable/formable than Co—Ni—Cr, making them better suited to permanent implants that need to be formed in-situ e.g. stents. Further, their magnetic properties open up an entirely new application as bio-inert implantable devices, e.g. micro bio-engines for inside the human body that are powered by the electrolysis of body fluids and bio-inert magnets, (magnetic fields have been shown to stimulate cell growth).

Catalytic Converters: Currently catalytic converters in cars contain platinum and palladium as the oxidation activation components of the system, The HEPAs could effectively be a lower-cost or high efficiency replacement for this platinum-palladium component.

Photocatalysts, Batteries and Fuel Cells: Platinum is currently used as an effective catalyst in the photocatalysis of water (splitting water into hydrogen and oxygen for fuel) and as catalysts in electrochemical batteries and fuel cells. The HEPAs may provide a high-yield, low-cost alternative to pure platinum in some of these applications.

Magneto-Optical Devices and Magnetic Data Storage: Similar to the technology used in re-writable DVDs and hard drives etc., Pt-based magneto-optical materials may offer long-life data storage options due to their environmentally inert properties.

Special Application Electric motors: Given their magnetic properties and biocompatibility, the HEPAs may be used in particular biological, cell-based or in vitro applications, e.g. biomotors (some bacteria use magnetic particles to move) and nanobots.

Magnetic Transistors/Spintronic Devices: Essentially the next generation in device switching and data storage—the potential end result is devices that can store more data in less space and consume less power—given their stable magnetic properties and environmentally inert nature, HEPAs have high potential in specific applications of this technology.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and method as disclosed herein.

The invention claimed is:

1. An alloy, with a solid solution matrix consisting of:

A)

| | |
|---|---|
| Platinum (Pt) | 20 to 70 at. %, |
| Palladium (Pd) | >0 to 70 at. %, and |
| Cobalt (Co) | >0 to 50 at. %; | and

B) at least one of:

| | |
|---|---|
| Nickel (Ni) | up to 50 at. %, |
| Chromium (Cr) | up to 50 at. %, and |
| Iron | up to 50 at. %; | wherein the alloy has a microsegregation of less than 3%.

2. The alloy of claim 1, with a solid solution matrix consisting of:

A)

| | |
|---|---|
| Platinum (Pt) | 20 to 70 at. %, |
| Palladium (Pd) | 0 to 70 at. %, and |
| Cobalt (Co) | 0 to 50 at. %; | and

B) at least one of:

| | |
|---|---|
| Ni | up to 50 at. %, and |
| Cr | up to 50 at. %. |

3. The alloy of claim 2, with a solid solution matrix consisting of:

A)

| | |
|---|---|
| Pt | 20 to 60 at. %, |
| Pd | 10 to 70 at. %, and |
| Co | 10 to 50 at. %; | and

B) at least one of:

| | |
|---|---|
| Ni | up to 40 at. %, and |
| Cr | up to 40 at. %. |

4. The alloy of claim 3, with a solid solution matrix consisting of:

A)

| | |
|---|---|
| Pt | 20 to 50 at. %, |
| Pd | 10 to 40 at. %, and |
| Co | 10 to 40 at. %; | and

B) at least one of:

| | |
|---|---|
| Ni | 10 to 40 at. %, and |
| Cr | 10 to 40 at. %. |

5. The alloy of claim 4, with a solid solution matrix consisting of:

A)

| | |
|---|---|
| Pt | 20 to 50 at. %, |
| Pd | 10 to 25 at. %, and |
| Co | 20 to 40 at. %; | and

B) at least one of:

| | |
|---|---|
| Ni | 20 to 25 at. %, and |
| Cr | 10 to 25 at. %. |

6. The alloy of claim 1, wherein Ni is present in an amount of 20 to 25 at. %.

7. The alloy of claim 1, wherein Pt is present in an amount of 35 to 55 at. %, Pd is present in an amount of 5 to 25 at. %, and Co is present in an amount of 35 to 45 at. %.

8. The alloy of claim 1, wherein the alloy consists of Pt 35 to 45 at. %, Pd 15 to 25 at. %, Co 15 to 35 at. % and Cr 5 to 25 at. %.

9. The alloy of claim 1, wherein the alloy consists of Pt 25 to <35 at. %, Pd 15 to 25 at. %, Co 35 to 45 at. % and Cr 15 to 25 at. %.

10. The alloy of claim 1, wherein the solid solution matrix has a heat-treated hardness ($H_v$) in the range of 163 to 243.

11. The alloy of claim 1, wherein the alloy is a heat-treated alloy.

12. The alloy of claim 11, wherein the heat-treatment comprises heating the alloy above 900° C. in an inert atmosphere.

13. The alloy of claim 12, wherein the heating is for a time in the range of 24 to 140 hours.

14. The alloy of claim 13, wherein the time is in the range of 45 to 100 hours.

15. The alloy of claim 11, wherein the heat-treatment comprises heating the alloy to 1,100° C.

16. An alloy, selected from $Pt_{25}Pd_{25}Co_{25}Cr_{25}$, $Pt_{40}Pd_{20}Co_{40}$, $Pt_{50}Pd_{10}Co_{40}$, $Pt_{40}Pd_{20}Co_{20}Cr_{20}$, $Pt_{40}Pd_{20}Co_{30}Cr_{10}$, or $Pt_{30}Pd_{20}Co_{30}Cr_{20}$.

17. An alloy, selected from $Pt_{25}Pd_{25}Co_{25}Ni_{25}$ or $Pt_{20}Pd_{20}Co_{20}Cr_{20}Ni_{20}$.

* * * * *